United States Patent
Kwon et al.

(10) Patent No.: US 11,489,232 B2
(45) Date of Patent: Nov. 1, 2022

(54) METHOD FOR MANUFACTURING SEPARATOR, SEPARATOR FORMED THEREBY, AND ELECTROCHEMICAL DEVICE INCLUDING SAME

(71) Applicant: LG CHEM, LTD., Seoul (KR)

(72) Inventors: Hye-Jin Kwon, Daejeon (KR); Myeong-Soo Kim, Daejeon (KR); Su-Jin Yoon, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 157 days.

(21) Appl. No.: 16/614,168

(22) PCT Filed: Dec. 21, 2018

(86) PCT No.: PCT/KR2018/016524
§ 371 (c)(1),
(2) Date: Nov. 15, 2019

(87) PCT Pub. No.: WO2019/132456
PCT Pub. Date: Jul. 4, 2019

(65) Prior Publication Data
US 2021/0184309 A1     Jun. 17, 2021

(30) Foreign Application Priority Data
Dec. 27, 2017   (KR) .................. 10-2017-0181012

(51) Int. Cl.
*H01M 50/403* (2021.01)
*H01M 50/446* (2021.01)
(Continued)

(52) U.S. Cl.
CPC ....... *H01M 50/403* (2021.01); *H01M 50/446* (2021.01); *H01M 50/449* (2021.01);
(Continued)

(58) Field of Classification Search
CPC ................... H01M 50/491; H01M 50/494
See application file for complete search history.

(56) References Cited

U.S. PATENT DOCUMENTS

| 4,250,002 A * | 2/1981 | Lazarz | ................ H01M 50/411 |
| | | | 205/523 |
| 2011/0259505 A1* | 10/2011 | Lee | ..................... H01M 50/461 |
| | | | 429/144 |

(Continued)

FOREIGN PATENT DOCUMENTS

| EP | 2 696 395 A1 | 2/2014 |
| KR | 10-2011-0057079 A | 5/2011 |

(Continued)

OTHER PUBLICATIONS

International Search Report issued in PCT/KR2018/016524 (PCT/ISA/210), dated Apr. 12, 2019.

(Continued)

*Primary Examiner* — Matthew T Martin
*Assistant Examiner* — Jessie L. Walls
(74) *Attorney, Agent, or Firm* — Birch, Stewart, Kolasch & Birch, LLP

(57) ABSTRACT

A method for manufacturing a separator, including the steps of: (S1) preparing a pre-dispersion including inorganic particles dispersed in a pre-dispersion solvent and a first binder polymer dissolved in the pre-dispersion solvent; (S2) conducting a preliminary milling of the pre-dispersion; (S3) preparing a binder polymer solution including a second binder polymer dissolved in a binder polymer solution solvent; (S4) mixing the pre-dispersion with the binder polymer solution and carrying out a secondary milling to obtain a slurry for forming a porous coating layer; and (S5) applying the slurry to at least one surface of a porous polymer substrate, followed by drying, is disclosed. A separator obtained by the method and an electrochemical (Continued)

device including the same are also disclosed. According to the present disclosure, it is possible to provide a separator having a uniform surface and showing improved adhesion.

12 Claims, 4 Drawing Sheets

(51) Int. Cl.
*H01M 50/449* (2021.01)
*H01M 10/0525* (2010.01)
*H01M 50/491* (2021.01)
*H01M 50/494* (2021.01)

(52) U.S. Cl.
CPC ....... *H01M 50/491* (2021.01); *H01M 50/494* (2021.01); *H01M 10/0525* (2013.01)

(56) References Cited

U.S. PATENT DOCUMENTS

| | | | |
|---|---|---|---|
| 2012/0015254 A1 | 1/2012 | Lee et al. | |
| 2012/0115036 A1 | 5/2012 | Lee et al. | |
| 2013/0316219 A1* | 11/2013 | Ha | H01M 50/449 427/596 |
| 2014/0295285 A1 | 10/2014 | Lee et al. | |
| 2015/0140404 A1* | 5/2015 | Yoo | H01M 50/403 429/145 |
| 2015/0155542 A1 | 6/2015 | Jeon et al. | |
| 2016/0149186 A1* | 5/2016 | Kim | H01M 50/42 429/144 |
| 2016/0164060 A1 | 6/2016 | Zhang et al. | |
| 2016/0190537 A1* | 6/2016 | Park | H01M 50/457 429/144 |
| 2016/0359155 A1 | 12/2016 | Hyun et al. | |
| 2017/0117566 A1 | 4/2017 | Yoon et al. | |
| 2017/0179456 A1* | 6/2017 | Kim | H01M 50/449 |
| 2018/0006285 A1* | 1/2018 | Lee | H01M 50/446 |
| 2019/0013504 A1 | 1/2019 | Choi et al. | |
| 2019/0131604 A1* | 5/2019 | Yoon | H01M 10/0525 |
| 2021/0226300 A1* | 7/2021 | Kwon | H01M 50/446 |

FOREIGN PATENT DOCUMENTS

| | | | |
|---|---|---|---|
| KR | 10-2011-0097715 A | 8/2011 | |
| KR | 10-2013-0007740 A | 1/2013 | |
| KR | 10-2014-0018128 A | 2/2014 | |
| KR | 10-2014-0060796 A | 5/2014 | |
| KR | 10-2015-0064438 A | 6/2015 | |
| KR | 10-2015-0084116 A | 7/2015 | |
| KR | 10-2015-0122611 A | 11/2015 | |
| KR | 10-2016-0015183 A | 2/2016 | |
| KR | 10-2017-0085825 A | 7/2017 | |
| KR | 10-2017-0091149 A | 8/2017 | |
| WO | WO-2021256905 A1 * | 12/2021 | .......... H01M 50/403 |

OTHER PUBLICATIONS

Extended European Search Report for European Application No. 18896598.2, dated Nov. 17, 2020.

* cited by examiner

METHOD FOR MANUFACTURING SEPARATOR, SEPARATOR FORMED THEREBY, AND ELECTROCHEMICAL DEVICE INCLUDING SAME

TECHNICAL FIELD

The present disclosure relates to a separator that may be used for an electrochemical device, such as a lithium secondary battery, a method for manufacturing a separator, and an electrochemical device including the separator.

The present application claims priority to Korean Patent Application No. 10-2017-0181012 filed on Dec. 27, 2017 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the safety problem of an electrochemical device, such as a lithium secondary battery, there has been suggested a separator including a porous coating layer formed by coating a mixture of an excessive amount of inorganic particles with a binder polymer onto at least one surface of a porous polymer substrate having a plurality of pores.

Meanwhile, commercially available porous coating layers are formed by a method which includes mixing a binder polymer with inorganic particles at once to obtain slurry for forming a porous coating layer, and applying the slurry to a porous polymer substrate. However, such a method is problematic in that the inorganic particles in the slurry for forming a porous coating layer are not dispersed effectively.

In addition, the separator obtained by the method has a problem of slightly low adhesion.

DISCLOSURE

Technical Problem

The present disclosure is directed to providing a method for manufacturing a separator by which inorganic particles in slurry for forming a porous coating layer can be dispersed homogeneously.

The present disclosure is also directed to providing a separator which shows excellent adhesion and has no protrusions on the surface thereof.

In addition, the present disclosure is directed to providing an electrochemical device including the separator.

Technical Solution

In one aspect of the present disclosure, there is provided a method for manufacturing a separator according to any one of the following embodiments.

According to the first embodiment of the present disclosure, there is provided a method for manufacturing a separator, including the steps of:

(S1) preparing a pre-dispersion including inorganic particles dispersed in a pre-dispersion solvent and a first binder polymer dissolved in the pre-dispersion solvent;

(S2) conducting a preliminary milling of the pre-dispersion; (S3) preparing a binder polymer solution including a second binder polymer dissolved in a binder polymer solution solvent, wherein the weight ratio of the first binder polymer to the second binder polymer is 0.5:99.5-10:90;

(S4) mixing the pre-dispersion with the binder polymer solution and carrying out a secondary milling to obtain a slurry for forming a porous coating layer, wherein a time of the secondary milling is 30-99% of a sum of a time of the preliminary milling time with the time of the secondary milling time; and (S5) applying the slurry to at least one surface of a porous polymer substrate, followed by drying.

According to the second embodiment of the present disclosure, there is provided the method for preparing a separator as defined in the first embodiment, wherein the sum of the time of the preliminary milling with the time of the secondary milling time is 2-6 hours.

According to the third embodiment of the present disclosure, there is provided the method for preparing a separator as defined in the first or the second embodiment, wherein the primary milling and secondary milling is independently carried out by any one selected from the group consisting of a bead mill, ball mill, high energy ball mill, planetary mill, stirred ball mill and a vibrating mill.

According to the fourth embodiment of the present disclosure, there is provided the method for preparing a separator as defined in any one of the first to the third embodiments, wherein a weight ratio of the inorganic particles: the first binder polymer is 80:20-99:1.

According to the fifth embodiment of the present disclosure, there is provided the method for preparing a separator as defined in any one of the first to the fourth embodiments, wherein the content of the first binder polymer in the pre-dispersion is 0.1 wt %-3 wt %, based upon a total weight of the pre-dispersion.

According to the sixth embodiment of the present disclosure, there is provided the method for preparing a separator as defined in any one of the first to the fifth embodiments, wherein the time of the secondary milling is 40-75% of the sum of the time of the preliminary milling with the time of the secondary milling.

According to the seventh embodiment of the present disclosure, there is provided the method for preparing a separator as defined in any one of the first to the sixth embodiments, wherein each of the first binder polymer and the second binder polymer independently include at least one selected from the group consisting of polyvinylidene fluoride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxymethyl cellulose or and combinations thereof.

According to the eighth embodiment of the present disclosure, there is provided the method for preparing a separator as defined in any one of the first to the seventh embodiments, wherein the first binder polymer includes at least one selected from the group consisting of acrylonitrile, cyanoethyl pullulan, cyanoethyl polyvinyl alcohol, cyanoethyl cellulose, cyanoethyl sucrose and combinations thereof.

According to the ninth embodiment of the present disclosure, there is provided the method for preparing a separator as defined in any one of the first to the eighth embodiments, wherein the inorganic particles include at least one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $AlOOH$, $TiO_2$, SiC and combinations thereof.

In another aspect of the present disclosure, there is also provided a separator according to any one of the following embodiments.

According to the tenth embodiment of the present disclosure, there is provided a separator obtained by the method as defined in any one of the first to the ninth embodiments.

In still another aspect of the present disclosure, there is also provided an electrochemical device according to any one of the following embodiments.

According to the eleventh embodiment of the present disclosure, there is provided an electrochemical device including a cathode, an anode and a separator interposed between the cathode and the anode, wherein the separator is defined in the tenth embodiment.

According to the twelfth embodiment of the present disclosure, there is provided the electrochemical device as defined in the eleventh embodiment, which is a lithium secondary battery.

Advantageous Effects

According to the present disclosure, it is possible to provide a method for manufacturing a separator that shows improved dispersibility of inorganic particles in slurry for forming a porous coating layer by modifying the processing conditions for the slurry for forming a porous coating layer.

According to the present disclosure, it is possible to provide a method for manufacturing a separator having improved physical properties by controlling the milling time of the slurry for forming a porous coating layer.

According to the present disclosure, it is possible to provide a separator having excellent adhesion and a uniform surface by the above-mentioned method, and an electrochemical device including the separator.

BEST MODE

Hereinafter, preferred embodiments of the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A separator having a porous coating layer formed on a porous polymer substrate may be provided with improved physical properties, when the inorganic particles in slurry for forming a porous coating layer are dispersed homogeneously. In addition, a separator having improved physical properties may be obtained by controlling the milling condition.

In one aspect of the present disclosure, there is provided a method for manufacturing a separator, including the steps of:

(S1) preparing a pre-dispersion including inorganic particles dispersed in a solvent and a first binder polymer dissolved in the solvent;

(S2) milling the pre-dispersion preliminarily;

(S3) preparing a binder polymer solution including a second binder polymer dissolved in a solvent, wherein the weight ratio of the first binder polymer to the second binder polymer is controlled to 0.5:99.5-10:90;

(S4) mixing the pre-dispersion with the binder polymer solution and carrying out milling secondarily to obtain slurry for forming a porous coating layer, wherein the milling is carried out in such a manner that the secondary milling time is 30-99% of the sum of the preliminary milling time with the secondary milling time; and (S5) applying the slurry for forming a porous coating layer to at least one surface of a porous polymer substrate, followed by drying.

Figure 1:
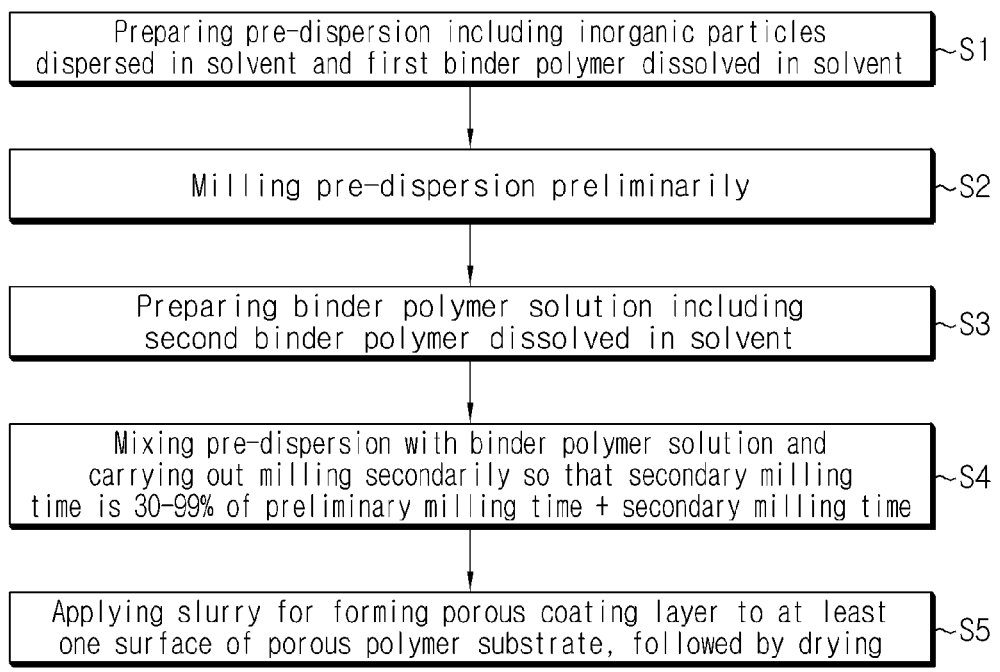
FIG. 1 is a flow chart illustrating the method for manufacturing a separator according to an embodiment of the present disclosure.

FIG. 1 is a flow chart illustrating the method for manufacturing a separator according to an embodiment of the present disclosure.

Hereinafter, the present disclosure will be explained in more detail with reference to FIG. 1.

In step (S1), prepared is a pre-dispersion including inorganic particles dispersed in a solvent and a first binder polymer dissolved in the solvent. Herein, the amount of the first binder polymer is significantly smaller than that of a second binder polymer.

When inorganic particles are dispersed in a solvent and a small amount of the first binder is dissolved in the solvent, it is possible to disperse the inorganic particles more homogeneously as compared to the case wherein the total amount of the binder polymer required for forming a porous coating layer is dissolved in the solvent at once. This is because the first binder polymer is present in a small amount to prevent aggregation of the inorganic particles among themselves. Thus, the resultant pre-dispersion has a reduced particle size and improved phase stability.

In the method for manufacturing a separator according to an embodiment of the present disclosure, the first binder polymer used for the pre-dispersion may be a polymer used currently for forming a porous coating layer in the art with no particular limitation, as long as it can disperse inorganic particles. Particularly, a polymer having a glass transition temperature ($T_g$) of −200° C. to 200° C. may be used. This is because such a polymer can improve the mechanical properties, such as flexibility and elasticity, of the finally formed porous coating layer. The first binder polymer functions as a binder which connects and stably fixes the inorganic particles with each other, and thus contributes to prevention of degradation of mechanical properties of a separator having a porous coating layer.

In addition, it is not essentially required for the first binder polymer to have ion conductivity. However, when using a polymer having ion conductivity, it is possible to further improve the performance of an electrochemical device. Therefore, a binder polymer having a dielectric constant as high as possible may be used as the first binder polymer. In fact, since the dissociation degree of a salt in an electrolyte depends on the dielectric constant of the solvent for the electrolyte, use of a binder polymer having a higher dielectric constant as the first binder polymer can improve the salt dissociation degree in an electrolyte. The first binder polymer may have a dielectric constant ranging from 1.0 to 100 (measured at a frequency of 1 kHz), particularly 10 or more.

In addition to the above-mentioned function, the first binder polymer may be characterized in that it is gelled upon the impregnation with a liquid electrolyte and thus shows a high degree of swelling. Thus, the first binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder polymer to be swelled with a conventional liquid electrolyte for a battery.

Non-limiting examples of the first binder polymer include but are not limited to: polyvinylidene fluoride, polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan or carboxymethyl cellulose.

Particularly, in the method for manufacturing a separator according to the present disclosure, the first binder polymer may be a cyano resin having a cyano (CN) group. The first binder polymer may be a cyano resin containing both a CN group and a hydroxyl (OH) group.

CN group is hydrophobic, and thus can prevent aggregation of inorganic particles. Meanwhile, CN group is hydrophobic but OH group is hydrophilic. Therefore, such hydrophilic OH groups surround the surface of hydrophilic inorganic particles so that the inorganic particles may be dispersed more homogeneously in the dispersion.

For example, the cyano resin may include acrylonitrile, cyanoethylpullulan, cyanoethylpolyvinyl alcohol, cyanoethyl cellulose, cyanoethyl sucrose or combinations thereof.

The content of the first binder polymer in the pre-dispersion may be 0.1-3 wt %. When the content of the first binder polymer is within the above-defined range, it is possible to solve the problem of aggregation of the inorganic particles or degradation of dispersion efficiency caused by the amount of the first binder polymer relatively smaller than that of the inorganic particles so that the inorganic particles may not be surrounded with the first binder sufficiently. It is also possible to alleviate the problem of re-aggregation of the remaining first binder polymer after the dispersion of the inorganic particles and degradation of the performance of an electrochemical device caused by an excessively large amount of the first binder polymer.

There is no particular limitation in the inorganic particles, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a combination thereof.

The inorganic particles having a dielectric constant of 5 or more may include $Al_2O_3$, $SiO_2$, $ZrO_2$, $AlOOH$, $TiO_2$, $BaTiO_3$, $Pb(Zr,Ti)O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/2}Nb_{2/3})O_{3-x}PbTiO_3$ (PMN-PT, wherein 0<x<1), hafnia ($HfO_2$), $SrTiO_3$, $SnO_2$, $CeO_2$, $MgO$, $NiO$, $CaO$, $ZnO$, $ZO_3$, $SiC$ or combinations thereof.

The inorganic particles having lithium ion transportability may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4), $P_2S_5$-based glass ($Li_xP_yS_z$, 0<x<3, 0<y<3, 0<z<7), or combinations thereof.

In addition, there is no particular limitation in the average particle diameter of the inorganic particles. However, the inorganic particles preferably have an average particle diameter of 0.001-10 μm in order to form a coating layer with a uniform thickness and to provide suitable porosity. When the average particle diameter is less than 0.001 μm, dispersibility may be degraded. When the average particle diameter is larger than 10 μm, the resultant porous coating layer may have an increased thickness.

According to the present disclosure, the combined weight of the inorganic particles and the first binder polymer may be 20-40 parts by weight based on 100 parts by weight of the pre-dispersion. Within the above-defined range, it is possible to improve the dispersibility of the inorganic particles in the pre-dispersion.

According to an embodiment of the present disclosure, the weight ratio of the inorganic particles to the first binder polymer may be 80:20-99:1, particularly 85:15-97.5:2.5, and more particularly 90:10-97.5:2.5. When the weight ratio of the inorganic particles to the first binder polymer satisfies the above-defined range, it is possible to prevent the problem of a decrease in pore size and porosity of the resultant porous coating layer caused by an excessively large amount of the first binder polymer, and to solve the problem of degradation of peeling resistance of the resultant coating layer caused by an excessively small amount of the first binder polymer. In addition, within the above-defined range, it is possible to solve the problem of aggregation of the inorganic particles or degradation of dispersion efficiency caused by the amount of the first binder polymer relatively smaller than that of the inorganic particles so that the inorganic particles may not be surrounded with the first binder polymer sufficiently. It is also possible to alleviate the problem of re-aggregation of the remaining first binder polymer after the dispersion of the inorganic particles and degradation of the performance of an electrochemical device caused by an excessively large amount of the first binder polymer.

The solvent may be a solvent having a low boiling point to facilitate removal of the solvent after manufacturing a separator. Particular examples of the solvent include acetone, tetrahydrofuran, methylene chloride, chloroform, dimethyl formamide, N-methyl-2-pyrrolidone, cyclohexane, water or combinations thereof.

Meanwhile, when two or more types of inorganic particles are used, they are mixed first, and then dispersed in the solvent containing the first binder polymer dissolved therein. This facilitates reduction of the particle size of slurry particles in the slurry for forming a porous coating layer.

According to an embodiment of the present disclosure, the pre-dispersion is prepared by introducing inorganic particles, the first binder polymer and the solvent to a mixing container and agitating them. The purpose of step (S1) is to dissolve the first binder polymer in the pre-dispersion and to disperse the inorganic particles preliminarily.

Next, in step (S2), the pre-dispersion is subjected to preliminary milling.

Herein, 'milling' means introducing solid contents to a bead mill homogenizer, or the like, and crushing and mixing the solid contents by the impact and friction of the rotor of the bead mill homogenizer. On the other hand, 'mixing' means introducing solid contents to an agitator, or the like, and agitating them simply.

The purpose of milling is to crush and disperse the inorganic particles efficiently in the pre-dispersion.

According to an embodiment of the present disclosure, the milling is not particularly limited, as long as it is used for preparing slurry for a porous coating layer in the art. According to another embodiment of the present disclosure, non-limiting examples of the milling include bead mill, ball mill, high energy ball mill, planetary mill, stirred ball mill, vibrating mill, or the like.

Herein, it is possible to facilitate dispersion of the inorganic particles more efficiently by controlling the rotation speed of the rotor of the bead mill homogenizer, the number of passing the pre-dispersion through the bead mill homogenizer, or the like.

In step (S3), a binder polymer solution including a second binder polymer dissolved in a solvent is prepared, wherein the weight ratio of the first binder polymer to the second binder polymer is 0.5:99.5-10:90.

In the method for manufacturing a separator according to the present disclosure, the weight ratio of the first binder polymer in the pre-dispersion to the second binder polymer in the binder polymer solution may be 0.5:99.5-10:90, 1:99-10:90, or 5:95-10:90. The lower limit of the weight ratio may be 0.5 or more, 1 or more, or 5 or more. The upper limit of the weight ratio may be 99.5 or less, or 90 or less. The weight ratio may be any combination of the upper limit with the lower limit.

In the method for manufacturing a separator according to an embodiment of the present disclosure, the second binder polymer used for forming a porous coating layer may be a polymer used currently for forming a porous coating layer in the art. In the separator according to an embodiment of the present disclosure, the second binder polymer may be the same as or different from the first binder polymer.

Particularly, a polymer having a glass transition temperature ($T_g$) of $-200°$ C. to $200°$ C. may be used. This is because such a polymer can improve the mechanical properties, such as flexibility and elasticity, of the finally formed porous coating layer. The second binder polymer functions as a binder which connects and stably fixes the inorganic particles with each other, and thus contributes to prevention of degradation of mechanical properties of a separator having a porous coating layer.

In addition, it is not essentially required for the second binder polymer to have ion conductivity. However, when using a polymer having ion conductivity, it is possible to further improve the performance of an electrochemical device. Therefore, a binder polymer having a dielectric constant as high as possible may be used as the second binder polymer. In fact, since the dissociation degree of a salt in an electrolyte depends on the dielectric constant of the solvent for the electrolyte, use of a binder polymer having a higher dielectric constant as the second binder polymer can improve the salt dissociation degree in an electrolyte. The second binder polymer may have a dielectric constant ranging from 1.0 to 100 (measured at a frequency of 1 kHz), particularly 10 or more.

In addition to the above-mentioned function, the second binder polymer may be characterized in that it is gelled upon the impregnation with a liquid electrolyte and thus shows a high degree of swelling. Thus, the second binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the second binder polymer include but are not limited to: polyvinylidene fluoride, polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan or carboxymethyl cellulose.

Then, in step (S4), the pre-dispersion is mixed with the binder polymer solution and the resultant mixture is subjected to secondary milling. Herein, the secondary milling time is set to be 30-99% of the total milling time of the preliminary milling time and the secondary milling time.

Figure 3:
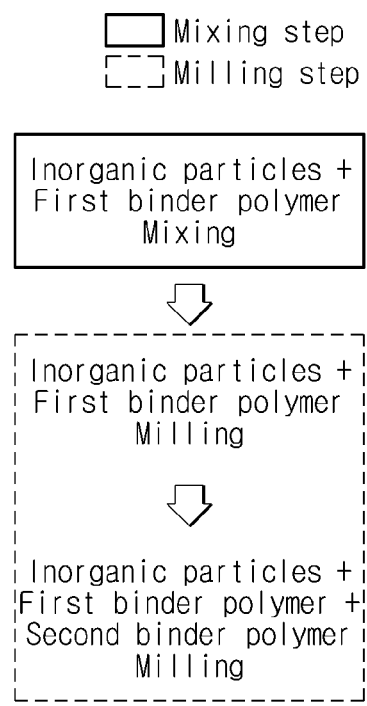

In the method for manufacturing a separator according to the present disclosure, after inorganic particles and a small amount of the first binder polymer are subjected to preliminary milling, the second binder polymer is introduced thereto and secondary milling is carried out (see, FIG. 3). According to the above-mentioned method, the first binder polymer allows the inorganic particles to be dispersed homogeneously in the pre-dispersion. Then, the second binder polymer imparts adhesion suitable for functioning as a separator.

On the contrary, according to the related art, inorganic particles are mixed with a binder polymer, and the resultant mixture is introduced to a bead mill homogenizer and milled at once. However, such a method is problematic in that the inorganic particles are not dispersed homogeneously in the slurry for forming a porous coating layer. As a result, the resultant separator shows a plurality of protrusions and low Peel Strength and Lami Strength.

Figure 2:
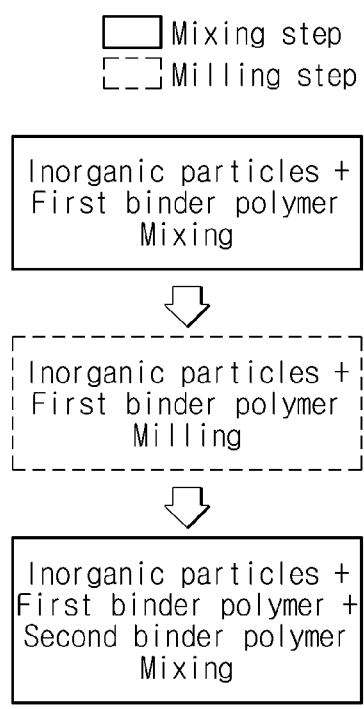
FIG. 2 to FIG. 4 are schematic views illustrating the methods for preparing slurry for forming a porous coating layer according to Examples and Comparative Examples.

In another method for preparing slurry for forming a porous coating layer according to the related art, inorganic particles are mixed with the first binder polymer, the resultant mixture is introduced to and milled in a bead mill homogenizer, followed by simple mixing with the second binder polymer (see, FIG. 2). In other words, the inorganic particles are milled only before mixing with the second binder polymer. When slurry for forming a porous coating layer is applied to a porous polymer substrate according to the method, no protrusions are generated but the second binder polymer cannot be mixed adequately with the inorganic particles. As a result, in this case, there is a problem of low Peel Strength and Lami Strength.

Figure 4:
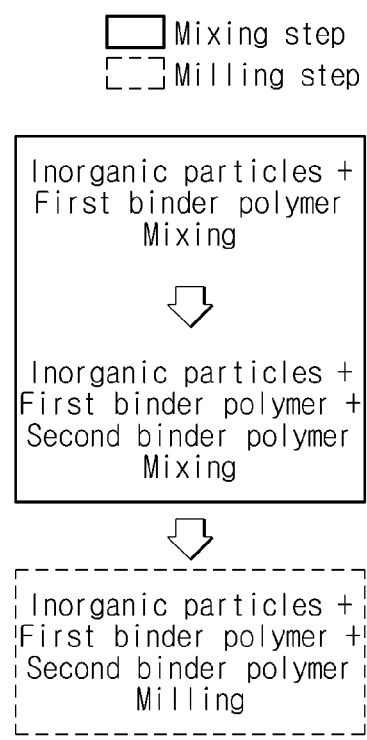

Meanwhile, in still another method according to the related art, inorganic particles are mixed with a small amount of the first binder polymer, the resultant mixture is mixed with the second binder polymer, and then the inorganic particles, the first binder polymer and the second binder polymer are subjected to milling at once (see, FIG. 4). When applying slurry for forming a porous coating layer obtained by the method to a porous polymer substrate, the inorganic particles are not crushed sufficiently and show low dispersibility to generate protrusions. As a result, the separator obtained by the method is not suitable for a separator for use in an electrochemical device.

In the method for manufacturing a separator according to the present disclosure, the secondary milling time is controlled to be 30-99% of the sum of the preliminary milling time with the secondary milling time.

Particularly, the ratio of secondary milling time may be calculated by the following Formula 1:

{(Secondary milling time/(Preliminary milling time+ Secondary milling time))×100    [Formula 1]

The ratio of the secondary milling time to the sum of the preliminary milling time with the secondary milling time may be 30-99%, 40-90%, or 40-75%. The lower limit of the ratio of the secondary milling time may be 30% or more, or 40% or more. The upper limit of the ratio of the secondary milling time may be 99% or less, 90% or less, or 75% or less. The ratio may be any combination of the upper limit with the lower limit.

The separator satisfying the above-defined range has no protrusions on the surface thereof. Thus, it is possible to provide a separator having a uniform surface. In addition, since the separator has no protrusions, there is no non-uniform increase in surface area between the separator and an electrode. Further, by virtue of the lack of non-uniform protrusions, adhesion between the separator and an electrode, i.e. Lami Strength, may be improved. Meanwhile, the separator satisfying the above-defined range has improved Peel Strength. Particularly, the separator has a Peel Strength of 100 gf/15 mm or more and a Lami Strength of 50 gf/15 mm or more.

The sum of the preliminary milling time with the secondary milling time may be 2-6 hours. The lower limit of the sum may be 2 hours or more, 2.5 hours or more, or 3 hours or more. The upper limit of the sum may be 6 hours or less, 5.5 hours or less, or 5 hours or less. In addition, the sum may be any combination of the upper limit with the lower limit.

The separator satisfying the above-defined range has no protrusions on the surface thereof. Thus, it is possible to provide a separator having a uniform surface. In addition, since the separator has no protrusions, there is no non-uniform increase in surface area between the separator and an electrode. Further, by virtue of the lack of non-uniform protrusions, adhesion between the separator and an electrode, i.e. Lami Strength, may be improved. Meanwhile, the separator satisfying the above-defined range has improved Peel Strength. Particularly, the separator has a Peel Strength of 100 gf/15 mm or more and a Lami Strength of 50 gf/15 mm or more.

As used herein, 'protrusions' means surface irregularities having a diameter of 50 μm or more present in 1 cm×1 cm of a separator.

As used herein, 'Peel Strength' means the adhesion between the porous substrate and the porous coating layer. Herein, Peel Strength is defined as the force required for separating the porous coating layer and the porous polymer substrate from each other, and it is determined by cutting the separator into a size of 15 mm×100 mm, attaching a double-sided adhesive tape to a glass plate so that the porous coating layer surface of the separator may be adhered to the adhesive tape, mounting the end portion of the separator to a UTM instrument, and applying force at 180° and a rate of 300 mm/min.

As used herein, 'Lami Strength' means the adhesion between the electrode and the outermost surface (porous coating layer) of the separator facing either of the electrodes. Herein, Lami Strength is defined as the force required for separating the electrode and the outermost surface (porous coating layer) of the separator facing either of the electrode, and it is determined by preparing an anode with a size of 15 mm×100 mm and a separator with a size of 15 mm×100 mm, stacking the separator and the anode and inserting the stack between PET films having a thickness of 100 μm, carrying out adhesion by using a flat press at 90° C. and 8.5 MPa under heating for 1 second, mounting the end portion of the adhered separator and anode to a UTM instrument, and applying force at 180° and a rate of 300 mm/min.

The slurry particle may have a sedimentation rate larger than 0 μm/s and equal to or less than 0.5 μm/s. According to an embodiment of the present disclosure, the slurry particle sedimentation rate may be 0.4 μm/s or less, or 0.3 μm/s or less. Within the above-defined range, the slurry particles show an adequately low sedimentation rate so that the particles may be dispersed homogeneously in the slurry, thereby facilitating improvement of phase stability.

Then, in step (S5), the slurry for forming a porous coating layer is applied to at least one surface of a porous polymer substrate, followed by drying, to provide a separator.

It is possible to obtain a separator having a porous coating layer formed thereon by applying the slurry for forming a porous coating layer.

Particularly, the porous polymer substrate may be a porous polymer film substrate or a porous polymer non-woven substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination.

In addition, the porous polymer film may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins Although there is no particular limitation in the thickness of the porous polymer substrate, the porous polymer substrate has a thickness of 1-100 μm, particularly 5-50 μm. Although there is no particular limitation in the size of the pores present in the porous substrate and porosity, the pore size and porosity may be 0.01-50 μm and 0.1-95%, respectively.

Although there is no particular limitation in the process for coating the composition for forming a porous coating layer onto the porous polymer substrate, a slot coating, dip coating, spray, ink jet printing, screen printing or a dispending process may be used. According to an embodiment of the present disclosure, the porous coating layer is formed preferably by using a slot coating or dip coating process. A slot coating process includes coating slurry supplied through a slot die onto the whole surface of a substrate and is capable of controlling the thickness of a coating layer depending on the flux supplied from a metering pump. In addition, dip coating includes dipping a substrate into a tank containing slurry to carry out coating and is capable of controlling the thickness of a coating layer depending on the concentration of slurry and the rate of removing the substrate from the slurry tank. Further, in order to control the coating thickness more precisely, it is possible to carry out post-metering through a Mayer bar or the like, after dipping.

Then, the porous polymer substrate coated with the slurry for forming a porous coating layer is dried by using a dryer, such as an oven, thereby forming a porous coating layer on at least one surface of the porous polymer substrate.

In the porous coating layers, the inorganic particles are bound among themselves by the binder polymer, while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

In another aspect of the present disclosure, there is provided a separator obtained by the above-described method.

The separator according to the present disclosure has excellent physical properties as determined by a Peel Strength of 100 gf/15 mm or more. The separator according to the present disclosure has excellent physical properties as determined by a Lami Strength of 50 gf/15 mm or more. In addition, the separator has no protrusion having a diameter of 50 μm or more present in a sample of 1 cm×1 cm. Thus, it is possible to obtain a separator having a uniform surface.

The electrochemical device according to still another embodiment of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^+$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

1) Manufacture of Anode

Artificial graphite, carbon black, CMC and binder were mixed with water at a weight ratio of 95.8:1:1:2.2 to obtain anode slurry. The anode slurry was coated on copper (Cu) foil to a thickness of 50 μm to form a thin electrode plate, which, in turn, was dried at 135° C. for 3 hours or more and then pressed to obtain an anode.

2) Manufacture of Cathode

A cathode active material ($LiCoO_2$), a conductive material (carbon black) and a binder (PVDF) were introduced to N-methyl-2-pyrrolidone (NMP) at a weight ratio of 96:2:2, followed by mixing, to obtain cathode slurry. The cathode slurry was coated on aluminum foil having a thickness of 20 μm at a capacity of 3.1 $mAh/cm^2$ to obtain a cathode.

3) Manufacture of Separator 3-1) Preparation of Slurry for Forming Porous Coating Layer $Al_2O_3$ inorganic particles (Japan Light Metal Co., LS235, particle size 500 nm) and the first binder polymer (cyanoethyl pullulan) were introduced to acetone at room temperature and agitated to prepare a pre-dispersion. In the pre-dispersion, the inorganic particles and the first binder polymer were used at a weight ratio of 97.5:2.5. The content of the first binder polymer in the pre-dispersion was 0.5 wt %.

The pre-dispersion was introduced to a bead mill homogenizer (Nanointec, NITUBM-3) and subjected to preliminary milling. Herein the rotor was rotated at 1750 rpm.

To the pre-dispersion subjected to preliminary milling, a binder polymer solution was introduced. Then, secondary milling was carried out to obtain slurry for forming a porous coating layer. The binder polymer solution was obtained by dissolving polyvinylidene fluoride (PVDF) as the second binder polymer in acetone, wherein the weight ratio of PVDF:acetone was 7:97.

Herein, the first binder polymer and the second binder polymer were used at a weight ratio of 9:91.

The secondary milling was carried out at a rotor rotation speed of 1750 rpm.

The secondary milling time was 40% based on the sum of the preliminary milling time with the secondary milling time, and the sum of the preliminary milling time with the secondary milling time was 4 hours.

3-2) Application and Drying of Slurry for Forming Porous Coating Layer

The slurry for forming a porous coating layer was applied to one surface of a polyethylene porous substrate by using a doctor blade, followed by drying, to obtain a separator having a porous coating layer formed thereon. The porous coating layer had a thickness of 4 μm.

4) Adhesion of Separator with Electrode

The separator was laminated with an electrode in such a manner that the separator was in contact with the active material layer of the electrode. Then, pressing was carried out at a temperature of 90° C. under 8.5 MPa for 1 second to obtain an electrode assembly in which the separator was laminated with the electrode.

Examples 2 and 3

Electrode assemblies were obtained in the same manner as Example 1, except that the preliminary milling time and the secondary milling time were controlled according to the following Table 1.

Comparative Example 1

An electrode assembly was obtained in the same manner as Example 1, except that slurry for forming a porous coating layer was obtained as described hereinafter.

$Al_2O_3$ inorganic particles (Japan Light Metal Co., LS235, particle size 500 nm) and the first binder polymer (cyanoethyl pullulan) were introduced to acetone at room temperature and agitated to prepare a pre-dispersion. In the pre-dispersion, the inorganic particles and the first binder polymer were used at a weight ratio of 97.5:2.5. The content of the first binder polymer in the pre-dispersion was 0.5 wt %.

The pre-dispersion was introduced to a bead mill homogenizer (Nanointec, NITUBM-3) and subjected to milling for 4 hours. Herein the rotor was rotated at 1750 rpm.

The pre-dispersion subjected to milling was discharged from the bead mill homogenizer and a binder polymer solution was introduced thereto, followed by mixing, to obtain slurry for forming a porous coating layer.

Comparative Example 2

An electrode assembly was obtained in the same manner as Example 1, except that the preliminary milling time and the secondary milling time were controlled according to the following Table 1.

Comparative Example 3

An electrode assembly was obtained in the same manner as Example 1, except that slurry for forming a porous coating layer was obtained as described hereinafter.

$Al_2O_3$ inorganic particles (Japan Light Metal Co., LS235, particle size 500 nm) and the first binder polymer (cyanoethyl pullulan) were introduced to acetone at room temperature and agitated to prepare a pre-dispersion. In the pre-dispersion, the inorganic particles and the first binder polymer were used at a weight ratio of 97.5:2.5. The content of the first binder polymer in the pre-dispersion was 0.5 wt %.

A binder polymer solution was introduced to the pre-dispersion and mixed for 30 minutes.

Then, the mixture of the pre-dispersion with the binder polymer solution was introduced to a bead mill homogenizer (Nanointec, NITUBM-3) and subjected to milling for 4 hours. Herein the rotor was rotated at 1750 rpm.

TABLE 1

| | Milling time (%) | | | | |
|---|---|---|---|---|---|
| | Preliminary milling (before introducing second binder)* | Secondary milling (after introducing second binder)** | Protrusions*** | Peel Strength (gf/15 mm) | Lami Strength (gf/15 mm) |
| Comp. Ex. 1 | 100 | 0 | X | 60 | 45 |
| Comp. Ex. 2 | 75 | 25 | Δ | 85 | 50 |
| Ex. 1 | 60 | 40 | X | 190 | 70 |
| Ex. 2 | 50 | 50 | X | 120 | 100 |
| Ex. 3 | 25 | 75 | X | 180 | 75 |
| Comp. Ex. 3 | 0 | 100 | ○ | 90 | 60 |

*Preliminary milling time: {Preliminary milling time/(Preliminary milling time + Secondary milling time)} × 100
**Secondary milling time: {Secondary milling time/(Preliminary milling time + Secondary milling time)} × 100
***Protrusions: Surface irregularities having a diameter of 50 μm or more present in 1 cm × 1 cm of separator. X: none, Δ: 1-5, ○: 6 or more

TEST EXAMPLES (1) Determination of Milling Time

A milling time in a bead mill homogenizer (Nanointec, NITUBM-3) was measured. In Table 1, 'secondary milling time (%)' means (secondary milling time)/(preliminary milling time+secondary milling time).

(2) Determination of Protrusions

The prepared separator sample was cut into a size of 1 cm×1 cm and the number of protrusions having a diameter of 50 μm or more present in the separator sample was counted. When the number of protrusions was 0, the sample was represented by 'X'. When the number of protrusions was 1-5, the sample was represented by 'Δ'. When the number of protrusions was 6 or more, the sample was represented by '○'.

(3) Determination of Peel Strength

Each of the separators according to Examples and Comparative Examples was cut into a size of 15 mm×100 mm. A double-sided adhesive tape was attached to a glass plate and the porous coating layer surface of the separator was attached to the adhesive tape. Then, the end portion of the separator was mounted to a UTM instrument (LLOYD Instrument LF Plus), and force was applied at 180° and a rate of 300 mm/min. The force required for separating the porous coating layer from the porous polymer substrate was measured.

(4) Determination of Lami Strength

An anode was manufactured in the same manner as Example 1) and cut into a size of 15 mm×100 mm. Each of the separators according to Examples and Comparative Examples was cut into a size of 15 mm×100 mm. The separator was stacked with the anode, and the stack was inserted between PET films having a thickness of 100 μm and adhered by using a flat press. Herein, the flat press was heated at 90° C. under a pressure of 8.5 MPa for 1 second. The end portion of the adhered separator and anode was mounted to a UTM instrument (LLOYD Instrument LF Plus), and force was applied at 180° and a rate of 300 mm/min. The force required for separating the anode from the outermost surface (porous coating layer) of the separator facing the anode was measured.

What is claimed is:

1. A method for manufacturing a separator, comprising the steps of:
    (S1) preparing a pre-dispersion comprising inorganic particles dispersed in a pre-dispersion solvent and a first binder polymer dissolved in the pre-dispersion solvent;
    (S2) conducting a preliminary milling of the pre-dispersion;
    (S3) preparing a binder polymer solution comprising a second binder polymer dissolved in a binder polymer solution solvent, wherein a weight ratio of the first binder polymer to the second binder polymer is 0.5:99.5-10:90;
    (S4) mixing the pre-dispersion with the binder polymer solution and carrying out a secondary milling to obtain a slurry for forming a porous coating layer, wherein a time of the secondary milling is 30-99% of a sum of a time of the preliminary milling with the time of the secondary milling; and
    (S5) applying the slurry to at least one surface of a porous polymer substrate, followed by drying,
    wherein each of the pre-dispersion solvent and binder polymer solution solvent are independently selected from the group consisting of acetone, tetrahydrofuran, methylene chloride, chloroform, dimethyl formamide, N-methyl-2-pyrrolidone, and cyclohexane.

2. The method for preparing a separator according to claim 1, wherein the sum of the time of the preliminary milling with the time of the secondary milling is 2-6 hours.

3. The method for preparing a separator according to claim 1, wherein the primary milling and secondary milling is independently carried out by any one selected from the group consisting of a bead mill, ball mill, high energy ball mill, planetary mill, stirred ball mill and a vibrating mill.

4. The method for preparing a separator according to claim 1, wherein a weight ratio of the inorganic particles: the first binder polymer is 80:20 to 99:1.

5. The method for preparing a separator according to claim 1, wherein a content of the first binder polymer in the pre-dispersion is 0-3 wt %, based upon a total weight of the pre-dispersion.

6. The method for preparing a separator according to claim 1, wherein the time of the secondary milling is 40-75% of the sum of the time of the preliminary milling with the time of the secondary milling.

7. The method for preparing a separator according to claim 1, wherein each of the first binder polymer and the second binder polymer independently comprises at least one selected from the group consisting of polyvinylidene fluoride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxymethyl cellulose and combinations thereof.

8. The method for preparing a separator according to claim 1, wherein the first binder polymer comprises at least one selected from the group consisting of acrylonitrile, cyanoethyl pullulan, cyanoethyl polyvinyl alcohol, cyanoethyl cellulose, cyanoethyl sucrose and combinations thereof.

9. The method for preparing a separator according to claim 1, wherein the inorganic particles comprise at least one selected from the group consisting of $BaTiO_3$, $Pb(Zr_xTi_{1-x})O_3$ (PZT, 0<x<1), $Pb_{1-x}La_xZr_{1-y}Ti_yO_3$ (PLZT, 0<<1, 0<y<1), $(1-x)Pb(Mg_{1/3}Nb_{2/3})O_{3-x}PbTiO_3$ (PMNPT, 0<x<1), hafnia ($HfO_2$), $SrTiO_3$, $SnO_2$, $CeO_2$, MgO, NiO, CaO, ZnO, $ZrO_2$, $Y_2O_3$, $Al_2O_3$, AlOOH, $TiO_2$, SiC and combinations thereof.

10. A separator obtained by the method as defined in claim 1.

11. An electrochemical device comprising a cathode, an anode and a separator interposed between the cathode and the anode, wherein the separator is defined in claim 10.

12. The electrochemical device according to claim 11, which is a lithium secondary battery.

* * * * *